United States Patent [19]

Lock

[11] 4,395,825
[45] Aug. 2, 1983

[54] DEVICE FOR REMOVING VEHICLE WINDSCREENS

[76] Inventor: Trevor S. Lock, 16 Bailey St., Eaglehawk, Bendigo, Victoria, Australia

[21] Appl. No.: 283,009

[22] Filed: Jul. 13, 1981

[30] Foreign Application Priority Data

Jul. 24, 1980 [AU] Australia .............................. PE4673

[51] Int. Cl.³ ................................................ B26B 7/00
[52] U.S. Cl. .................................... 30/272 R; 30/277; 29/275
[58] Field of Search .................. 30/123, 277, 272, 356, 30/169, 346, 168, 272 R, 272 A, 140; 29/239, 275, 270, 426.5

[56] References Cited

U.S. PATENT DOCUMENTS 1,521,265  12/1924  Anderson .

FOREIGN PATENT DOCUMENTS 507749  12/1978  Australia .
1116778  2/1956  France .............................. 30/272 R Primary Examiner—Jimmy C. Peters
Attorney, Agent, or Firm—Roylance, Abrams, Berdo & Farley

[57] ABSTRACT

A device capable of use either by hand or with a powered reciprocating actuator for removing vehicle glass panels that have been adhesively bonded into a vehicle frame using an elastomeric sealing strip, said device comprising an elongated flexible blade having a gripping element and a sharpened edge at opposed longitudinal ends thereof, the sharpened edge being curved and coplanar with one face of the blade.

17 Claims, 10 Drawing Figures

DEVICE FOR REMOVING VEHICLE WINDSCREENS

The present invention relates to a device for use in removing windscreens or other glass panels in motor vehicles.

Over recent years windscreens have been fitted to motor vehicles using an elastomeric strip adhesively bonded to an edge region of the glass windscreen and to part of the body work of the vehicle with the elastomeric strip being compressed between the windscreen and the vehicle body work. It is often necessary to remove such windscreens after they have been secured by this method. Typically, once a windscreen has been broken the remaining parts of the windscreen have to be completely removed to allow a new windscreen to be inserted. Other situations occur, for example, when a windscreen requires resealing and needs to be removed for this purpose or when a vehicle owner wishes to replace a shatter windscreen with a laminated windscreen. In these situations, it is desirable to remove the old windscreen without damage so that it can be reused. There have been a small range of tools available specifically designed for this task, however most have had only limited success and generally all have been operated from the external side of the glass. Consequently it has proved to be a difficult time consuming and tedious task to remove a windscreen, even in situations where care was not needed to avoid breaking the windscreen.

The objective of the present invention is to provide a device for use in removing stick-in windscreens of the aforementioned type in a manner which minimizes the chances of breakages while decreasing the time taken for the operation.

According to the present invention there is provided a device for removing from a vehicle a glass panel secured in the vehicle by an elastomeric sealing strip, said device comprising an elongated flexible blade having a sharp edge at one end and including means at the other end to allow the blade to be manually gripped or operably gripped by a reciprocating power tool. Preferably, the blade consists of a generally rectangular strip of flat spring steel, the sharpened end of said blade having a generally semicircular or curved configuration such that substantially no sharp edges are formed when seen in plan view. The blade is preferably sharpened along at least the complete edge formed by said curved configuration region, the sharpening being effected such that the sharpened edge is located in the plane of one of the faces of the blade.

In operation the sharpened end of the blade is forced into the region of the elastomeric strip adjacent the windscreen, preferably into the adhesive material forming the bond between the windscreen glass and the elastomeric strip such that the substantially flat face of the blade is engaged against the inner surface of the glass. The blade is preferably inserted such that its axis forms an acute angle with elastomeric strip and thereafter the blade is reciprocated as well as being rocked forward and rearwardly in the direction of the elastomeric strip with the blade moving along the plane of the glass to separate the elastomeric strip from the glass. If the elastomeric strip includes an edge strip peripherally surrounding the windscreen, the blade may then be inserted from the outside along the edge strip to allow removal of the windscreen from the vehicle body. In this operation it is preferable to use a blade of shorter length as great flexibility is not needed due to the fact that there are no substantial obstacles on the external side of the windscreen.

The invention will now be described with reference to the accompanying drawings which illustrate preferred embodiments thereof. In the drawings.

Figure 1:
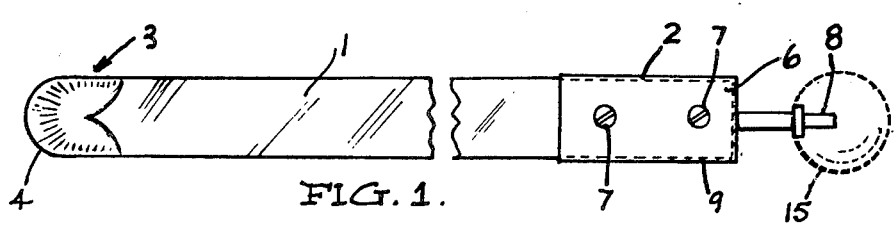
FIG. 1 is a plan view of a device in accordance with a preferred embodiment of the present invention.

Referring to FIG. 1, there is shown an elongated flexible blade 1 secured within a holder 2. The holder 2 may be of metal construction or alternatively of moulded plastics material. The holder 2 includes a socket 6 adapted to receive an end 9 of the blade 1. A screw 7 releasably secures the blade 1 within the socket 6. It will, however, be appreciated that other means for securing the blade to the holder may be employed or alternatively, the holder may be permanently secured to the blade. The holder 2 includes a collar and hammer stem 8 adapted to fit in a pneumatically operated reciprocable tool such as a pneumatic chisel. Alternatively a manual handle 15 shown in phantom outline may be provided with a bore of a dimension such that it fits over the hammer stem 8 with a friction fit thereon. The end 9 of the blade 1 may include a non slip grip covering 14 for use when the blade device is being used manually.

Figure 1A:
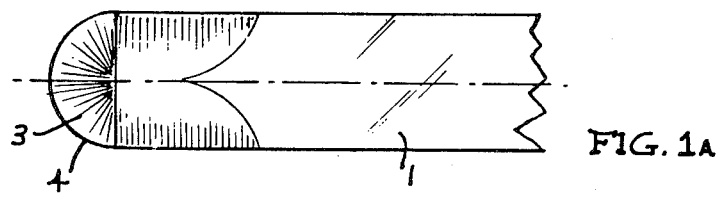
FIGS. 1A to 1F are detailed plan and side elevation views of various preferred embodiments illustrating the sharpened end region of blades of the type illustrated in FIG. 1.
Figure 1B:
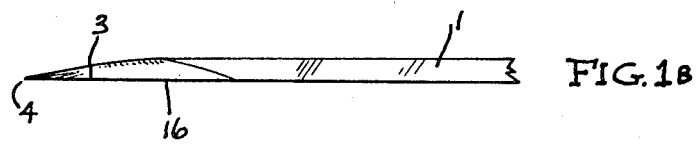
Figure 1C:
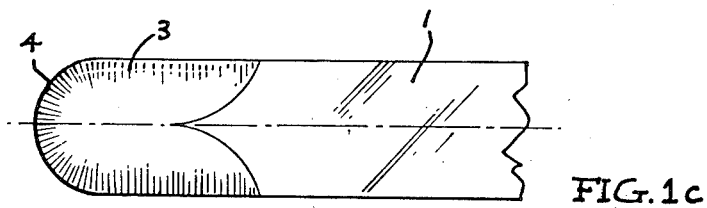
Figure 1D:
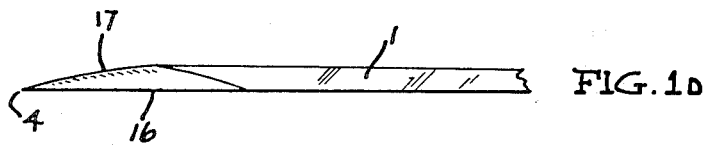
Figure 1E:
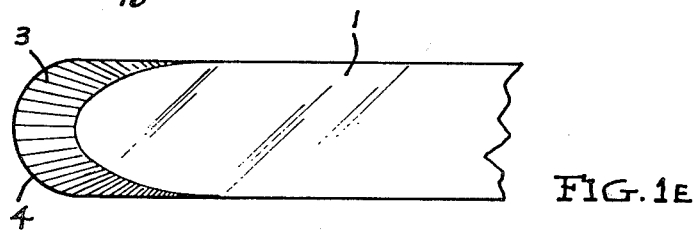
Figure 1F:
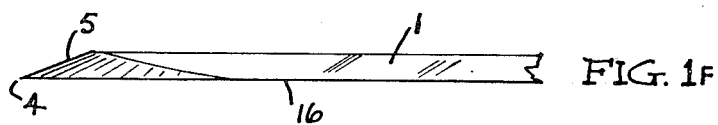

The blade 1 has a sharpened end 3 of a generally semicircular configuration when seen in plan view. In consequence, in the plan view there are no sharp edges or corners which could engage or damage the vehicle body or windscreen during a removal operation. As shown in FIGS. 1A and 1B, the semicircular sharpened end 3 initially has its forward end ground tapering towards the most forward extremity of the blade. Furthermore, the longitudinal side edges of the blade are ground tapering towards the side edges for a short distance along the blade. The length of this region need only be of sufficient dimension to ensure that when the blade is inserted in the elastomeric sealing strip, a sharpened region of the blade is always in contact with the strip. It will be appreciated that the grinding of the end 3 produces a continuous sharpened edge 4 substantially completely around the end 3 and within the plane of one of the faces 16 of the blade. FIGS. 1C and 1D show the blade of FIGS. 1A and 1B subsequently sharpened by a user of the device using a sharpened stone or the like. The sharpened end produced has a very sharp edge 4 with a curved face 17 of the blade. FIGS. 1E and 1F demonstrate an alternative embodiment wherein the sharp edge 4 is formed by an angular plane 5 peripherally surrounding the end 3 of the blade. Again the end 3 is semicircular in plan view and the sharpened edge 4 is in the face 16 of the blade and extends a short distance along the blade itself.

Figure 2:
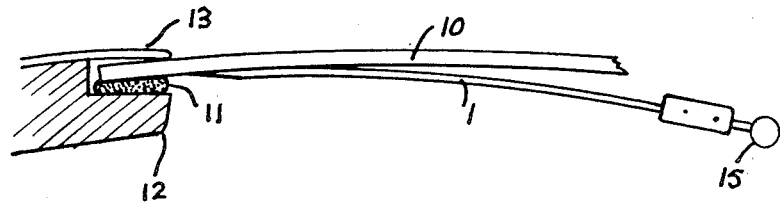
FIGS. 2 and 3 are schematic side elevation views showing the device in a position for use in removing a windscreen.
Figure 3:
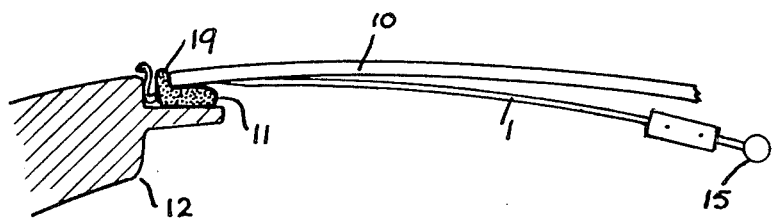
Figure 4:
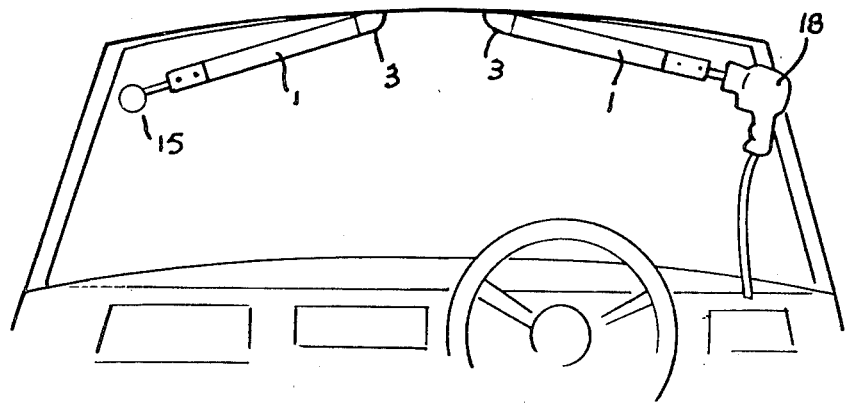
FIG. 4 is a view similar to FIGS. 2 and 3 showing the device in plan view.

FIGS. 2, 3 and 4 of the drawings show how the device is used to remove a vehicle windscreen. In FIG. 2 there is shown a windscreen 10 adhesively bonded to an elastomeric edge strip 11, the strip 11 being bonded to a vehicle frame part 12. An outer metal edge strip 13 covers the edge region of the windscreen. As shown in FIG. 4 the blade 1 of the device according to the present invention is either operated manually or secured within a reciprocating power tool 18. The blade 1 is transversely flexible and is guided at an acute angle to the strip 11 to reciprocate along the plane of the glass windscreen with the sharp edge 4 of the blade travelling along the plane of the glass. The blade is worked into and through the strip 11 to break or cut the bond between the glass and strip. The blade is then capable of movement along the edge strip 11 to quickly cut the windscreen out of the vehicle body. FIG. 3 is a view similar to FIG. 2 wherein the strip 11 includes an edge region 19 peripherally surrounding the windscreen. With this arrangement, the blade 1 is operated firstly within the vehicle as with FIG. 2 and then the edge region 19 is cut in a similar manner from the outside of the vehicle.

The outer cut may be achieved using a blade of substantially shorter length than that required for the more difficult cut on the inner side of the windscreen. Furthermore there are no obstacles on the outer side and thus substantial flexibility is not of any great advantage.

According to a further embodiment of the present invention the blade 1 may be given a permanently curved longitudinal axis. A curved blade of this configuration is of particular advantage when the blade length is short, thereby minimizing the effort required to flex the blade for use.

The present invention provides both apparatus and a method of removing windscreens from vehicles in a relatively quick manner without any great difficulty or complication and without any unnecessary breakage of the windscreen. As a result, danger from splintered or fractured glass is avoided and damage to the vehicle is minimized. In addition, the elastomeric sealing strip is largely left in one piece which makes it far easier and simpler to remove.

I claim:

1. A device for removing a glass panel secured in a vehicle by an elastomeric sealing strip, comprising:
an elongated, flexible blade having first and second ends, first and second longitudinal sides, and first and second opposed faces;
a sharpened edge at said first end and extending along a short length of said first longitudinal side from said first end, said sharpened edge being located in the plane of said first face of said flexible blade; and
means, mounted at said second end, for permitting said flexible blade to be gripped manually or to be operatively mounted in a reciprocating power tool.

2. A device according to claim 1 wherein said flexible blade comprises a substantially rectangular strip of flat spring steel.

3. A device according to claim 2 wherein said sharpened edge is tangential to said longitudinal edges of said flexible blade.

4. A device according to claim 3 wherein said sharpened edge includes a region which is substantially semicircular when viewed perpendicular to said first face of said flexible blade.

5. A device according to claim 4 wherein said blade is curved along a longitudinal axis thereof in its free state.

6. A device according to claim 3 wherein said blade is curved along a longitudinal axis thereof in its free state.

7. A device according to claim 2 wherein said blade is curved along a longitudinal axis thereof in its free state.

8. A device according to claim 1 wherein said blade is curved along a longitudinal axis thereof in its free state.

9. A device according to claim 2 wherein said sharpened edge includes a region which is substantially semicircular when viewed perpendicular to said first face of said flexible blade.

10. A device according to claim 1 wherein said sharpened edge includes a region which is substantially semicircular when viewed perpendicular to said first face of said flexible blade.

11. A device according to claim 1 wherein said sharpened edge is tangential to said longitudinal edges of said flexible blade.

12. A method of removing a glass panel from a vehicle which has een secured in the vehicle by an elastomeric material sealing strip, comprising the steps of:
reciprocating an elongated, flexible blade having a sharpened edge at a first end thereof, which edge extends along a short length of a first longitudinal side of said blade from said first end and is located in the plane of a first face of said blade; and
maintaining said first face of said blade in sliding contact with the glass panel to be removed as said sharpened edge reciprocates against the sealing strip to separate the glass panel from the sealing strip.

13. A method according to claim 12 wherein said flexible blade comprises a substantially rectangular strip of flat spring steel.

14. A method according to claim 12 wherein said sharpened edge is tangential to said longitudinal edges of said flexible blade.

15. A method according to claim 12 wherein said sharpened edge includes a region which is substantially semicircular when viewed perpendicular to said first face of said flexible blade.

16. A method according to claim 12 wherein said blade is curved along a longitudinal axis thereof in its free state.

17. A method according to claim 12 wherein said blade reciprocates at an acute angle relative to the sealing strip.

* * * * *